United States Patent Office 2,909,414
Patented Oct. 20, 1959

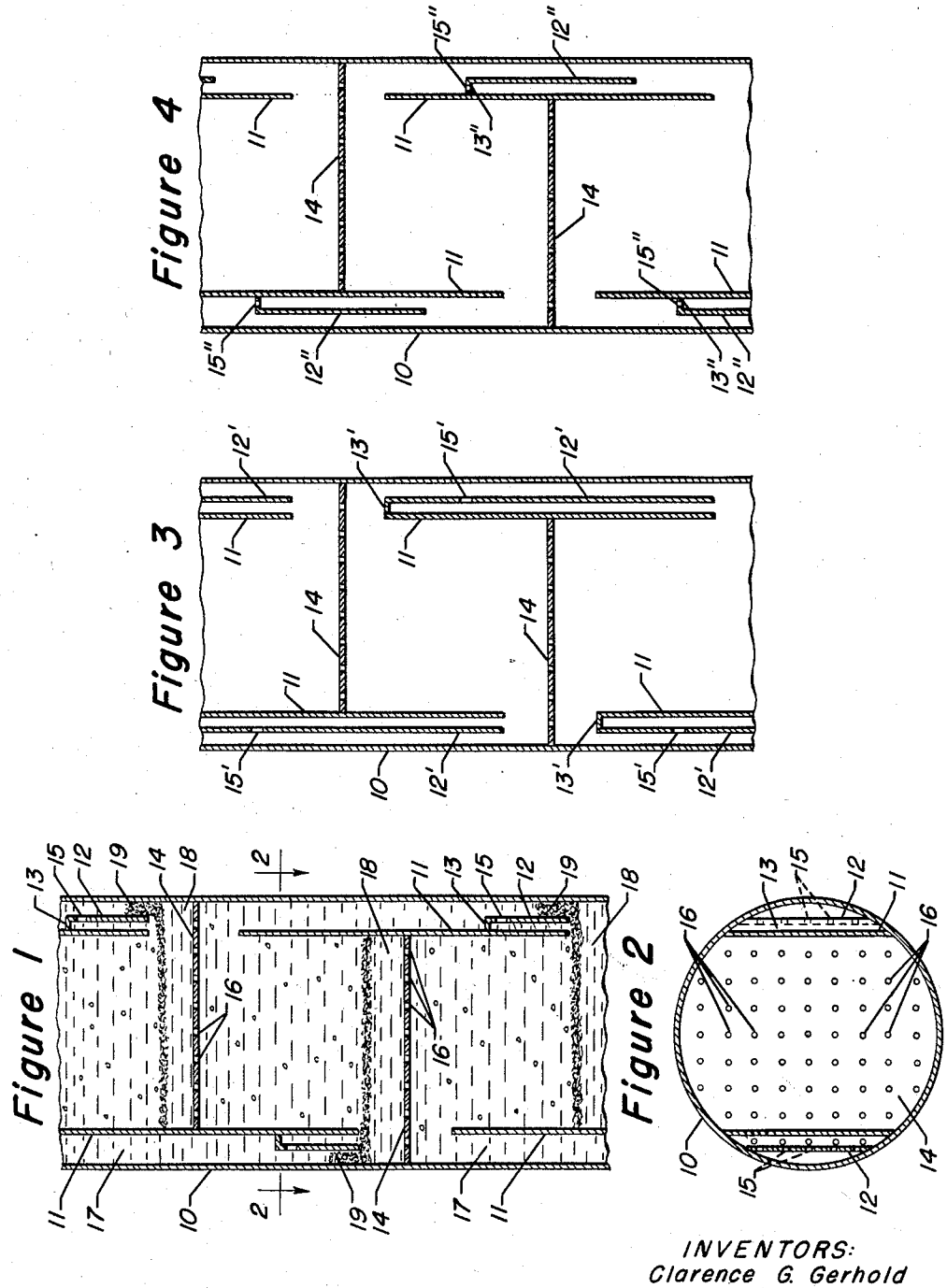

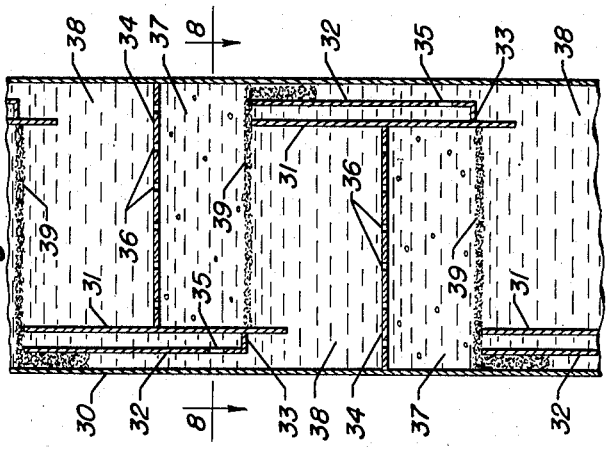
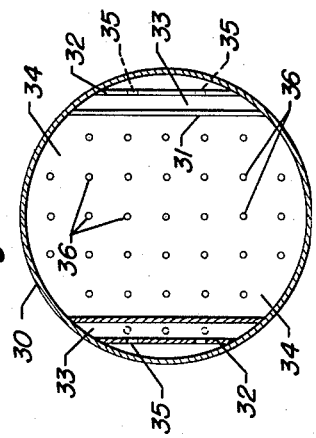
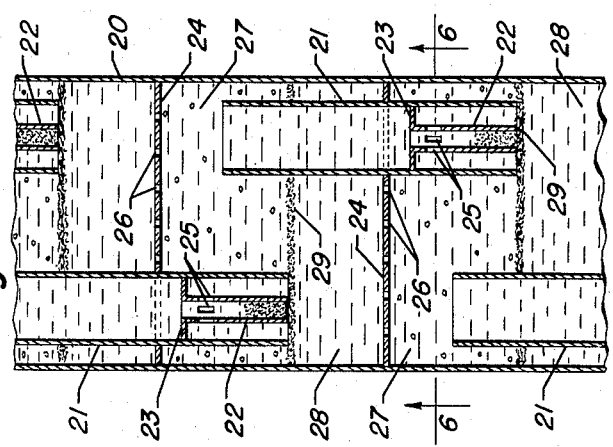
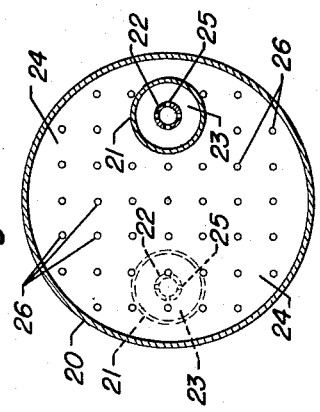

2,909,414

LIQUID-FLUID CONTACTING MEANS

Clarence G. Gerhold, Palatine, and Jack B. Pohlenz, Arlington Heights, Ill., assignors, by mesne assignments, to Universal Oil Products Company, Des Plaines, Ill., a corporation of Delaware Application September 25, 1958, Serial No. 763,311

15 Claims. (Cl. 23—270.5)

This application is a continuation-in-part of our copending application Serial No. 562,264, filed January 30, 1956, now abandoned, which in turn is a continuation-in-part of our application Serial No. 333,188, filed January 26, 1953, now abandoned, and relates to a liquid-fluid contacting column. In particular, this invention relates to a special fluid transfer conduit connecting adjacent zones of a multi-stage liquid-fluid contactor.

In many applications, it is desirable to contact two fluid phases which are characterized in that an interfacial tension exists between the two phases. The two fluids may be a liquid and a gas or two substantially immiscible liquids such as gasoline and water. There are many applications wherein it is desirable to transfer material or energy between two such phases. Typical processes include but are not limited to fractionation, absorption, scrubbing, liquid-liquid extraction, etc. In many of these applications, some form of perforated plate or bubble deck is used through which one phase passes into the other phase. When many stages are required in order for sufficient contact to be effected or to obtain a particular equilibrium between the phases, the various contacting zones are conveniently stacked one upon another in an elongated cylindrical vessel which is divided into a series of zones by placing perforated plates across its cross-section at regular intervals along its height. Adjacent zones in such a column are often connected by conduits passing through each perforated deck which conduct the undispersed fluid to the next contacting zone.

In some multi-stage liquid-fluid contactors the inventories of the various phases within the column or the level of liquid on each sieve deck may conveniently be controlled by disposing the conduits interconnecting the various stages so that the conduit extends both above and below the plate with the upper portion of the conduit at a higher elevation than the lower portion of the next higher conduit. Therefore, when the column is operated so that the more dense phase is discontinuous, or the one dispersed downwardly through the perforations, and the less dense phase is continuously passing from each stage through the conduit or upcomer connecting that stage with its next superjacent stage, the less dense phase is withdrawn from each contacting stage at the interface between the phases. When operating at low throughputs of less dense material there is little difficulty since small particles of more dense phase entrained at the interface settle from the low velocity stream going up the connecting conduit; however, as the flow rate of less dense phase increases, a greater amount of more dense material is entrained in the stream flowing between adjacent contacting zones and ultimately a substantial amount is carried over into the next superjacent zone. This results in recirculating material between stages instead of effecting true countercurrent contact. It is an object of this invention to provide a fluid transfer conduit which avoids this difficulty when employed in a liquid-fluid contacting column of the character described and operated so that the more dense phase is discontinuous.

In other types of multi-stage liquid-fluid contactors, particularly vapor-liquid fractionation columns, it is universal practice to operate the column so that the less dense phase is discontinuous. The general arrangement of sieve decks and interconnecting conduits is identical with that hereinbefore described, but the entrainment occurs in a downwardly flowing instead of an upwardly flowing stream. The less dense phase is dispersed upwardly through the perforations, and the more dense phase continuously passes from each stage through the conduit or downcomer connecting that stage with its next subjacent stage; the more dense phase is withdrawn from each contacting stage at the interface between the two stages. When operating at low throughputs of more dense material there is little difficulty since small particles of the less dense phase entrained at the interface escape from the low velocity stream going down the connecting conduit; however, as the flow rate of more dense phase increases, a greater amount of less dense material is entrained in the stream flowing between adjacent contacting zones and finally a considerable amount is carried down into the next subjacent zone. This again results in recirculating material between stages instead of effecting true countercurrent contact. In the case of vapor-liquid fractionation columns the phenomenon of bubble formation, known as "frothing" occurs in the downcomer which, if the liquid loading becomes high enough, will cause filling of the downcomer, subsequent flooding of the stage immediately above the downcomer, and ultimate flooding of the entire column. It is a further object of this invention to provide a fluid transfer conduit which avoids these difficulties when employed in a liquid-fluid contacting column of the character described and operated so that the less dense phase is discontinuous.

In one of its embodiments, this invention relates to a contacting column having a horizontal perforated plate forming contacting sections in the column on opposite sides of said plate, the combination of a vertical fluid transfer conduit extending above and below said plate and having an open end in each of said contacting sections, means forming a chamber within at least a portion of said conduit, said chamber being of smaller cross-section than the conduit and having an open end and a closed end, said open end being vertically spaced from said closed end, and said chamber-forming means having at least one opening of restricted cross section.

Another embodiment of this invention relates to a contacting column having a horizontal perforated plate forming contacting sections in the column on opposite sides of the plate, the combination of a vertical fluid transfer conduit extending above and below said plate and having an open end in each of said contacting sections, partitioning means forming a chamber within an end portion of said conduit, said chamber being of smaller cross-section than the conduit and having an open end adjacent one of the open ends of the conduit, and the opposite end of the chamber being closed, said chamber having a vertical wall provided with at least one opening of restricted cross-section connecting the interior of the chamber with the interior of the conduit.

Still another embodiment of this invention relates to a contacting column having a horizontal perforated plate forming contacting sections in the column on opposite sides of the plate, the combination of a vertical fluid transfer conduit extending above and below said plate and having an open end in each of said contacting sections, partitioning means forming a chamber within the lower portion of said conduit, said chamber being of smaller cross-section than the conduit and being open at its lower end and closed at its upper end, said chamber having a vertical wall provided with at least one opening of restricted cross-section below the closed upper end of the chamber and connecting the interior of the chamber with the interior of the conduit.

In still another of its embodiments, this invention relates to a contacting column having a horizontal perforated plate forming contacting sections in the column on opposite sides of the plate, the combination of a vertical cylindrical conduit extending above and below said plate and having an open end in each of said contacting sections, a cylindrical baffle within the upper end of said conduit and spaced from the inner walls of said conduit, a closure for the lower end of the annular space between said baffle and the walls of the conduit, the opposite end of said space being open, and at least one opening of restricted cross-section in said baffle and connecting the interior of the cylindrical baffle with said annular space.

Briefly, this invention deals with a transfer conduit of novel design for passing fluid between two adjacent stages in a contacting column. The design of this transfer conduit prevents entrainment of one phase in the other in the transfer conduit even though the material passing through the conduit is taken from the interface between the phases and even though small particles of one phase are dispersed in the other at the interface.

The configuration and operation of this invention can best be described with reference to the accompanying drawings which illustrate in Figure 1 an elevation view of a typical embodiment of this invention wherein the denser phase is dispersed in the less dense phase and in Figure 2, the plan view of the embodiment of Figure 1. In Figures 3 and 4 several variations of this embodiment are shown; Figure 5 illustrates an elevation view of a more specific embodiment of this invention wherein the fluid transfer conduit or upcomer is cylindrical, Figure 6 being the plan view of the embodiment shown in Figure 5.

In Figure 7 an elevation view of a typical embodiment of this invention is illustrated wherein the less dense phase is dispersed in the denser phase, Figure 8 illustrating the plan view of this embodiment.

Referring to Figures 1 and 2 in which corresponding parts have the same numbers, a portion of a column comprising two perforated plates in combination with their accompanying conduits is illustrated. Outer shell 10 of the column will usually be cylindrical but may have any shape and will be fabricated to withstand the pressure and temperature conditions that may exist within the interior. Plates 14 containing perforations 16 are horizontally disposed in shell 10 and these plates are suitably sealed to the interior of shell 10 so that no substantial flow of fluid will occur between stages other than through the channels provided. In the embodiment of Figure 1, baffles 11, which are vertical and connect to shell 10, form chord-shaped conduits for transferring fluid between the adjacent contacting stages. Vertical wall 12 disposed in the lower portion of the conduit and connected at its upper end by partition 13 to the interior of baffle 11 forms a small chamber which openly communicates with the interior of the transfer conduit through opening 15 which has a restricted cross-section; that is, opening 15 has a cross-sectional area smaller than the cross-sectional area of the chamber formed between baffle 11 and vertical wall 12.

As hereinbefore stated, Figures 1 and 2 illustrate an embodiment of the apparatus utilizable in an operation in which the more dense phase 18 is dispersed. The more dense phase 18 which forms a layer immediately above plate 14 rains down through perforations 16 as subdivided droplets. The inter-phase contact effected by such raining causes the desired transfer of material or energy between the droplets and the less dense phase 17; however, the turbulent contact causes a dispersion 19 of uncoalesced particles of one phase in the other to appear at the interface between them. The less dense phase 17 passing upwardly through the conduit formed by baffle 11 discharges into the top of each contacting zone, passes downwardly and laterally through the zone and enters the bottom of the conduit leading to the next superjacent contacting zone. Without the novel design of the conduit of this invention, greater or lesser quantities of dense phase droplets will pass up the conduit with less dense phase 17; however, the design of the lower portion of this fluid transfer passageway prevents this by the following means.

When operating at low less dense fluid flow rates, very small amounts of material will be entrained because of the low velocity of the fluid in the passageway and at the interface. The chamber between baffle 11 and wall 12 will act like any conventional passageway between adjacent contacting zones. When the less dense fluid flow rate is increased sufficiently, however, the fluid passing through restricted opening 15 will experience sufficient pressure drop to cause a portion of less dense phase to pass beneath wall 12. Depending upon the size of the restriction and flow rate of less dense fluid, the amount passing beneath wall 12 may vary from 1 or 2% of the total flow to 30 or 40% of the total flow in extreme cases. In any event, when the less dense fluid transfer rate is sufficient to cause any fluid to pass beneath wall 12, say 10% of the total, then the fluid passing beneath wall 12 lowers the interface at the mouth of the chamber formed between baffle 11 and wall 12 and sweeps it free of foam or uncoalesced liquid. This causes only clear less dense fluid to pass into the chamber and through restricted opening 15, while the small percentage of material passing beneath wall 12 maintains a certain amount of dispersion in the lower portion of the conduit proper. This amount of dispersion will stand high enough in the conduit to balance the pressure drop through restricted opening 15; however, it will remain as an inventory of dispersion in more or less static balance and will not actually pass up the entire conduit into the next superjacent zone.

The overall effect of this is, that carrying over of material between zones is eliminated; in other words, more dense phase 18 which rains down into the next subjacent zone will not be entrained in less dense phase 17 and returned to the zone from which it came. This, of course, prevents overloading the column by recirculating material between zones. Another important consideration is that the pressure drop required to force the less dense fluid to flow between zones is a direct function of the flow rate and the cross-sectional area of restricted opening 15 and is therefore predictable on ordinary fluid flow principles. Since the rate of fluid flow through the conduit is only governed by the rate of input to the column, this pressure drop will not be magnified by entrainment, which, in extreme cases, may increase the flow of fluid through the conduit by several times the charge rate of light fluid into the column.

While the embodiment of the invention illustrated in Figures 1 and 2 is preferred for reasons of economy and ease of manufacture, the essential features of this invention are in no way limited to the particular structural arrangement disclosed therein. Referring now to Figure 3 it is seen that wall 12' may extend the full vertical length of baffle 11, and restricted opening 15' may be located anywhere in wall 12' between top closure 13' and the open end of the chamber. Wall 12' may extend a short distance below baffle 11 if desired; and it is not essential to the invention that wall 12' be vertical or flat but may be disposed obliquely to the vertical, or may be curved, or have an irregular surface. Referring to Figure 4, it is further evident that wall 12'' may extend only over a portion of baffle 11, and restricted opening 15'' may be located in top closure 13''.

Figures 5 and 6 illustrate a particular modification of the embodiment disclosed in Figures 1 and 2 and is especially adapted for use with cylindrical fluid transfer conduits. In this embodiment, cylindrical column 20 contains cylindrical transfer conduits 21 which pass through the perforated plates 24 and also conduct fluid between stages. Cylindrical baffle 22, having an upper annular-shaped cap 23 forms the chamber through which the clear fluid flows free of entrained dispersion. An opening of restricted cross-section 25 connects the interior of cylindrical baffle 22 with the annular space between baffle 22 and conduit 21. In Figure 5 the column is divided into contacting sections by horizontal plates 24, each of which contains perforations 26 and each of which is sealed on their outer peripheries to the interior walls of the column to prevent fluid from passing between zones, except through the desired channels.

In the operation of the embodiment of the invention illustrated by Figures 5 and 6, the denser phase 28 is discontinuous, forms a layer on each deck up to the height of the lower portion of transfer conduit 21, passes through perforations 26 into the next subjacent contacting section, breaking into droplets on the underside of the decks and descending in dispersed form through less dense phase 27, thereafter reaccumulating as a layer of dense fluid on the next subjacent deck, and redispersing into the next lower stage. The less dense phase 27 is continuous, forms a layer above dense phase 28, and flows upwardly through conduit 21 into the less dense phase in the next superjacent contacting section. A dispersion 29 forms at the interface between phases and, were it not for the present invention, would be entrained in the upwardly flowing stream of less dense phase ascending to the next higher deck from which it came. By virtue of this invention, however, most of the upwardly flowing less dense fluid passes to the next higher stage by entering the annular chamber between conduit 21 and cylindrical baffle 22, flowing through restricted opening 25 into the main conduit and thence into the less dense phase in the contacting section above. As hereinabove described, when there is sufficient flow of less dense fluid a portion of this fluid will pass under baffle 22 and flow up the center of the transfer conduit; however, in flowing under the bottom of baffle 22 this small flow will sweep the mouth of the annular chamber free of dispersion so that in the main channel of conduit 21 above baffle 22 only less dense fluid will be flowing. Again, as in the embodiment of Figure 1, a small inventory of dispersion will exist at the mouth of the conduit; however, this material merely balances the pressure drop through restricted opening 25 and does not enter the main flow of less dense fluid 27.

Figures 7 and 8 illustrate a more general embodiment of the apparatus utilizable in an operation wherein the less dense phase is dispersed and the more dense phase is continuous, the latter passing between stages by overflowing a conduit which conducts it into the layer of more dense phase on the next subjacent plate. It is apparent that the construction of this embodiment is identical with that of Figure 1, except that the chamber is closed at its lower end instead of at its upper end. Plates 34 containing perforations 36 are horizontally disposed in column shell 30. Baffles 31 which are vertical and connect to shell 30 form chord-shaped conduits for transferring fluid between the adjacent contacting stages. Vertical wall 32 disposed in the conduit and connected at its lower end by partition 33 to the interior of baffle 31 forms a small chamber which openly communicates with the interior of the transfer conduit through restricted opening 35.

In operating the form of the invention shown in Figures 6 and 7, denser phase 38 is continuous and forms a layer on each deck up to the height of the upper portion of baffle 31. The more dense phase then overflows and passes through the conduit into the more dense phase on the next subjacent deck while less dense phase 37 passes through perforations 36 and ascends in dispersed form to the top of the more dense phase on the next superjacent stage, reaccumulating as a layer and then being redispersed into the next higher stage. A dispersion 39 forms at the interface of the two phases, and, in the absence of the present invention, would be entrained in the downwardly flowing dense phase stream to the next lower deck from which it came. By modifying the conduit in accordance with this invention, however, the overflowing dense fluid passes to the next lower stage by entering the chamber between baffle 31 and vertical wall 32, flowing through restricted opening 35 into the main conduit and thence into the more dense phase in the stage below. As hereinbefore described, when the flow of more dense fluid is sufficient, a portion of this material will pass over vertical wall 32 and flow down the center of the transfer conduit; however, in flowing over the top of wall 32, this small flow will sweep the mouth of the chamber formed between wall 32 and conduit 31 free of dispersion so that in the main channel of the conduit beneath the chamber, only more dense fluid will be flowing.

In the particular case wherein the less dense fluid is a vapor, the functioning of the embodiment of Figure 7 is somewhat different but the same beneficial results will obtain. In a conventional fluid transfer conduit, or downcomer, the reduction in the capacity of the downcomer results not only from physical transport of the vapor by the liquid phase, but also from the formation of bubbles or "froth" in the downcomer, the latter condition arising from the conversion of the kinetic energy of the downwardly flowing liquid stream into surface energy, i.e., bubble formation. But by applying this invention to such a system the flow of the liquid stream into the chamber and through orifice 35 is accompanied by frictional losses of such magnitude that the kinetic energy of the liquid stream is dissipated in the form of heat, to the detriment of bubble formation, and "frothing" is accordingly largely eliminated.

As in the embodiments of Figures 1, 2, 3, and 4, it is within the scope of the embodiment of Figure 7 to permit various configurations of the principal elements. For example, wall 32 may extend the full vertical length of baffle 31, or may extend only over a portion of baffle 31, or may project a short distance above the baffle, if desired. Restricted opening 35 may be located anywhere in wall 32 or may be located in bottom closure 33. Wall 32 need not be vertical or flat but may be disposed obliquely to the vertical, or may be curved, or have an irregular surface.

It is further contemplated that the embodiment of Figure 7 may be modified in the manner of Figure 5, except that annular end closure 23 of Figure 5 would accordingly be positioned below restricted opening 25 instead of above it, this adaptation being desirable for use with downcomers of circular cross-section.

As a specific example of the utility and effectiveness of this invention, a transparent device was constructed which contained all of the essential elements of a single contacting stage, having a transparent baffle connected to opposite walls in parallel relationship to one wall and spaced 2¾" from it. The weir represented by the bottom of the baffle was 6" long. The single stage was employed in contacting an aqueous diethylene glycol stream with a benzene-containing hydrocarbon stream for the purpose of selectively dissolving benzene from the hydrocarbon in one equilibrium stage. The aqueous glycol stream was the more dense fluid while the hydrocarbon stream which was the less dense phase was introduced at a rate of 6 gallons per minute. The entrainment of glycol in the hydrocarbon stream flowing at that rate and passing beneath the six inch weir formed a froth or dispersion which completely filled the conduit formed by the baffle. The froth formed in this manner resulted in the transfer of a large volume of glycol completely through the conduit.

The apparatus was reconstructed only to the extent of adding a vertical wall inside of the original conduit as shown in Figure 1, with the new wall in the position that wall 12 occupies in Figure 1 and placing a cap over the wall similar to the cap 13 in Figure 1. The distance between the baffle and the vertical wall was ½" with the added wall extending the entire length of the conduit. A series of four ½" holes directly beneath the cap served as the restricted opening to the interior of the conduit. The original hydrocarbon flow rate of 6 gallons per minute was then re-established. The results obtained by use of the additional wall were quite dramatic. Observation through the transparent walls showed that the interface between the phases became parabolic in shape as it approached the bottom of the conduit passing to the next higher stage and a full ½" of clear liquid existed beneath the chamber formed between the baffle and the vertical wall. In the transfer conduit horizontally adjacent the additional wall, that is, equivalent to wall 12 of Figure 1, an extremely dense and turbulent column of dispersion stood to a height of 3"; however, there was absolutely no entrainment in the upper part of the conduit. In other words, the addition of wall 12 to the column transformed an operation having so much entrainment as to be virtually inoperable into an operation having no entrainment problem at all. In addition, the pressure drop required to drive 6 gallons per minute of hydrocarbon through the contacting stage was less.

In addition to the various modifications of this invention hereinbefore described, many other modifications will be apparent to those skilled in the art without departing from the broad scope of the invention. The shape of the column or the conduits may be varied so that cross-sections other than circular or chordal are thereby provided. Furthermore, the tray assembly may employ a number of smaller conduits instead of one large one. The conduits may have saw-tooth or serrated bottoms on either or both of the partitions so that special weir characteristics may be achieved when desired. The plate perforations may be in the form of drilled or punched holes or may be more elaborate openings such as slots, nozzles, bubble caps or holes lined with special material or having special interior configurations.

Modification may also be made in the manner of restricting the flow from the chamber within the fluid transfer conduit. The restrictions may be in the form of small holes as shown or they may be in the form of a constricted throat-like portion in the chamber formed within the conduit. Any other means of reducing the cross-section of the chamber may be employed as long as the essential elements of having a restriction in the chamber and a discharge into the undispersed phase leaving the contacting stage are retained. The amount of restriction may be varied, depending on the desired flow rate of undispersed phase and these variations may be extensive without necessarily reducing the effectiveness of this invention.

From the foregoing description, it may readily be seen that the present invention in any of its many forms provides a means of simply and effectively increasing the efficiency of a liquid-fluid contacting column as well as increasing the throughput for a given size column and the ease with which the operation may be performed.

We claim as our invention:

1. In a contacting column having a horizontal perforated plate forming contacting sections in the column on opposite sides of the plate, the combination of a vertical fluid transfer conduit extending above and below said plate and having an open end in each of said contacting sections, partitioning means forming a chamber within at least a portion of said conduit, said chamber being of smaller cross-section than the conduit and having an open end and a closed end, the open end of which is vertically spaced from said closed end, and said partitioning means having at least one opening of restricted cross-section.

2. The apparatus of claim 1 further characterized in that said chamber is located within an end portion of said vertical fluid transfer conduit.

3. The apparatus of claim 2 further characterized in that said chamber has a vertical wall containing said opening of restricted cross-section connecting the interior of the chamber with the interior of the conduit.

4. The apparatus of claim 3 further characterized in that said open end of the chamber is adjacent one of the open ends of the conduit.

5. In a contacting column having a horizontal perforated plate forming contacting sections in the column on opposite sides of the plate, the combination of a vertical fluid transfer conduit extending above and below said plate and having an open end in each of said contacting sections, partitioning means forming a chamber within an end portion of said conduit, said chamber being of smaller cross-section than the conduit and having one end open and the opposite end closed, said open end being adjacent to one of the open ends of the conduit, said chamber having a vertical wall provided with at least one opening of restricted cross-section a greater distance from the open end than from the closed end of the chamber and connecting the interior of the chamber with the interior of the conduit.

6. The apparatus of claim 1 further characterized in that said chamber is open at its lower end and closed at its upper end.

7. The apparatus of claim 6 further characterized in that said chamber has a vertical wall provided with at least one opening of restricted cross-section above said open lower end of the chamber, said opening connecting the interior of the chamber with the interior of the conduit.

8. The apparatus of claim 7 further characterized in that said chamber is located within an end portion of said conduit.

9. In a contacting column having a horizontal perforated plate forming contacting sections in the column on opposite sides of the plate, the combination of a vertical fluid transfer conduit extending above and below said plate and having an open end in each of said contacting sections, partitioning means forming a chamber within the lower portion of said conduit, said chamber being of smaller cross-section than the conduit and being open at its lower end and closed at its upper end, said chamber having a vertical wall provided with at least one opening of restricted cross-section below the closed upper end of the chamber and connecting the interior of the chamber with the interior of the conduit.

10. In a contacting column having a horizontal perforated plate forming contacting sections in the column on opposite sides of the plate, the combination of a vertical cylindrical conduit extending above and below said plate and having an open end in each of said contacting sections, a cylindrical baffle within the lower end of said conduit and spaced from the inner walls of the conduit, a closure for the upper end of the annular space between said baffle and the walls of the conduit, the opposite end of said space being open, and at least one opening of restricted cross-section in said baffle, said opening connecting the interior of the cylindrical baffle with said annular space.

11. The apparatus of claim 1 further characterized in that said chamber is open at its upper end and closed at its lower end.

12. The apparatus of claim 11 further characterized in that said chamber has a vertical wall provided with at least one opening of restricted cross-section above said closed lower end of the chamber and connecting the interior of the chamber with the interior of the conduit.

13. The apparatus of claim 12 further characterized in that said chamber is located within an end portion of said conduit.

14. In a contacting column having a horizontal perforated plate forming contacting sections in the column on opposite sides of the plate, the combination of a vertical fluid transfer conduit extending above and below said plate and having an open end in each of said contacting sections, partitioning means forming a chamber within the upper portion of said conduit, said chamber being of smaller cross-section than the conduit and being closed at its lower end and open at its upper end, said chamber having a vertical wall provided with at least one opening of restricted cross-section above the closed lower end of the chamber and connecting the interior of the chamber with the interior of the conduit.

15. In a contacting column having a horizontal perforated plate forming contacting sections in the column on opposite sides of the plate, the combination of a vertical cylindrical conduit extending above and below said plate and having an open end in each of said contacting sections, a cylindrical baffle within the upper end of said conduit and spaced from the inner walls of the conduit, a closure for the lower end of the annular space between said baffle and the walls of the conduit, the opposite end of said space being open, and at least one opening of restricted cross-section in said baffle and connecting the interior of the cylindrical baffle with said annular space.

No references cited.